(12) United States Patent
Sandei

(10) Patent No.: US 6,298,644 B1
(45) Date of Patent: Oct. 9, 2001

(54) TOMATO HARVESTER WITH IMPROVED PLANT HANDLING DEVICES

(75) Inventor: Luigi Sandei, Collecchio (IT)

(73) Assignee: FMC Italia S.p.A., Parma (IT)

( * ) Notice: Subject to any disclaimer, the term of this patent is extended or adjusted under 35 U.S.C. 154(b) by 0 days.

(21) Appl. No.: 09/394,509

(22) Filed: Sep. 13, 1999

(30) Foreign Application Priority Data

Sep. 14, 1998 (IT) .............................................. PC980019 U

(51) Int. Cl.[7] .................................................... A01F 11/08
(52) U.S. Cl. ............................................ 56/327.1; 460/144
(58) Field of Search ................................ 56/16.4 R, 16.5, 56/327.1, 328.1; 171/14, 27, 127, 12; 460/123, 99, 96, 131, 142, 144, 146, 147

(56) References Cited

U.S. PATENT DOCUMENTS

| | | | |
|---|---|---|---|
| 3,999,613 | * 12/1976 | Porter | 171/14 |
| 4,156,465 | * 5/1979 | Porter | 171/14 |
| 4,262,477 | * 4/1981 | Turold et al. | 56/327.1 |
| 4,335,570 | * 6/1982 | Fitzmaurice | 56/327.1 |
| 5,099,636 | * 3/1992 | Yoder | 56/327.1 |
| 5,197,269 | * 3/1993 | Meester | 56/327.1 |
| 5,480,353 | * 1/1996 | Garza, Jr. | 460/148 |
| 5,702,301 | * 12/1997 | Meester | 460/144 |
| 5,846,129 | * 12/1998 | Dragt | 460/144 |

\* cited by examiner

Primary Examiner—Robert E. Pezzuto
(74) Attorney, Agent, or Firm—Young & Thompson

(57) ABSTRACT

A tomato harvester includes loading systems designed to introduce cut plants into the harvester. Further systems designed to shake the plants received from the loading systems detach the tomatoes. A number of parallel bars are situated below the loading systems and are oriented toward the shakers. A conveyor pulls the plants from the loading area towards the shakers and then from the shakers towards a discharge area. The route of the conveyor has at least one section which leads from the discharge area to the shakers. The harvester is configured to eliminate a number of components which can cause soil accumulation and clogging in known harvesters.

9 Claims, 4 Drawing Sheets

TOMATO HARVESTER WITH IMPROVED PLANT HANDLING DEVICES

BACKGROUND OF THE INVENTION

This invention relates to a tomato harvester characterised by the special configuration of the plant handling devices which eliminates a number of drawbacks present in harvesters designed in accordance with the known state of the art and considerably increases the practicality of the machine. In particular, in the harvester in accordance with the invention, the grid conveyor that discharges the plants stripped of tomatoes onto the ground runs inside the harvester to a point beneath the belt that feeds in the cut plants, following a route that first conveys the plants to shakers that detach the tomatoes from the plants, and then discharges the stripped plants onto the ground.

This configuration eliminates a number of components which can cause soil accumulation and clogging in known harvesters.

The machines used for mechanised tomato harvesting are generally self-propelled and have a cutting blade at the front to cut the plants at ground level and a feed belt that picks up the cut plants and unloads them into the harvester, where shakers detach the tomatoes so that they fall onto a second conveyor belt which leads to collecting containers. The plants are then removed from the harvester by a conveyor belt which receives them at the exit from the shakers and discharges them onto the ground outside the harvester.

For the sake of clarity, one of these harvesters of known type will now be illustrated schematically, by reference to the annexed FIGS. 1 and 2.

The various devices are fitted to a chassis 1 mounted on wheels 2 which are driven by a motor not illustrated in the figure.

The front of the harvester is fitted with a cutting blade 3 mounted on an adjustable-height header 4.

Blade 3 cuts the plants, which fall onto a belt 5, also fitted to header 4; the said belt 5 conveys the plants to a feed belt 6 which unloads the plants bearing the tomatoes into the harvester.

There, the plants fall onto a kind of sloping grid consisting of a set of parallel bars 7, spaced at a sufficient distance apart to allow the tomatoes to fall through the grid, beneath which they are collected by a collector belt 8 that unloads them into collecting containers.

A shaker device 9 of known type is installed in proximity to bars 7. The plants conveyed from sloping bars 7 fall onto a grid conveyor 12 installed beneath the shaker.

All these devices are known, and described, for example, in Italian patent no. 1,278,260 held by the applicant, from which further details can be obtained.

In current harvesters, devices that push the plants forward are fitted immediately below feed belt 6, preventing the said feed belt 6 from dragging them backwards on its return route; in this specific case the device is constituted by a rubber roller 13.

For this purpose a roller 13 made of rubber or other material is fitted immediately beneath feed belt 6, in correspondence with the area in which the said belt unloads the plants bearing the tomatoes.

The roller is kept rotating at a higher speed than belt 6 so as to push the plants towards shaker 9.

The surface of roller 13 presents a number of grooves into which the ends of bars 7 are inserted so that they do not project outwards from the roller surface.

The bars are supported by support arms 14 located immediately downstream of roller 13.

In these known harvesters the plants discharged from belt 6 fall onto bars 7 where they are engaged by rods 10 which pull them forwards as they rotate, and at the same time shake the plants to detach the tomatoes. At the exit from the shaker the plants are discharged outside the harvester by grid conveyor 12, while the tomatoes that fall through the grid are collected by belt 8.

Any plants caught in feed belt 6, which would otherwise tend to drag them backwards, are subject to the action of roller 13, which rotates with a peripheral speed greater than the speed of belt 6 and pushes the plants forward towards shaker 9.

Although this known solution produces good results, it presents a number of drawbacks; in particular, if the soil is wet or damp, it easily adheres to the rubber roller and accumulates in the area between bars 7 and feed belt 6, which soon clogs.

SUMMARY OF THE INVENTION

The aim of this invention is to eliminate the said drawback, and for that purpose it offers a tomato harvester in which the grid conveyor is configured in such a way that it leads to a point beneath feed belt 6, where it presents a section that slopes in the direction of shaker 9.

As a result, the conveyor pushes the plants forward towards the shaker, thus making rubber roller 13 superfluous.

Moreover, in accordance with a special aspect of the invention, bars 7 are fixed to the chassis of the harvester at a point upstream of the grid conveyor, thus eliminating all the parts which cause clogging due to the accumulation of wet soil in known harvesters.

BRIEF DESCRIPTION OF THE INVENTION

This invention will now be described in detail, by way of example but not of limitation, by reference to the annexed figures in which.

Figure 3:
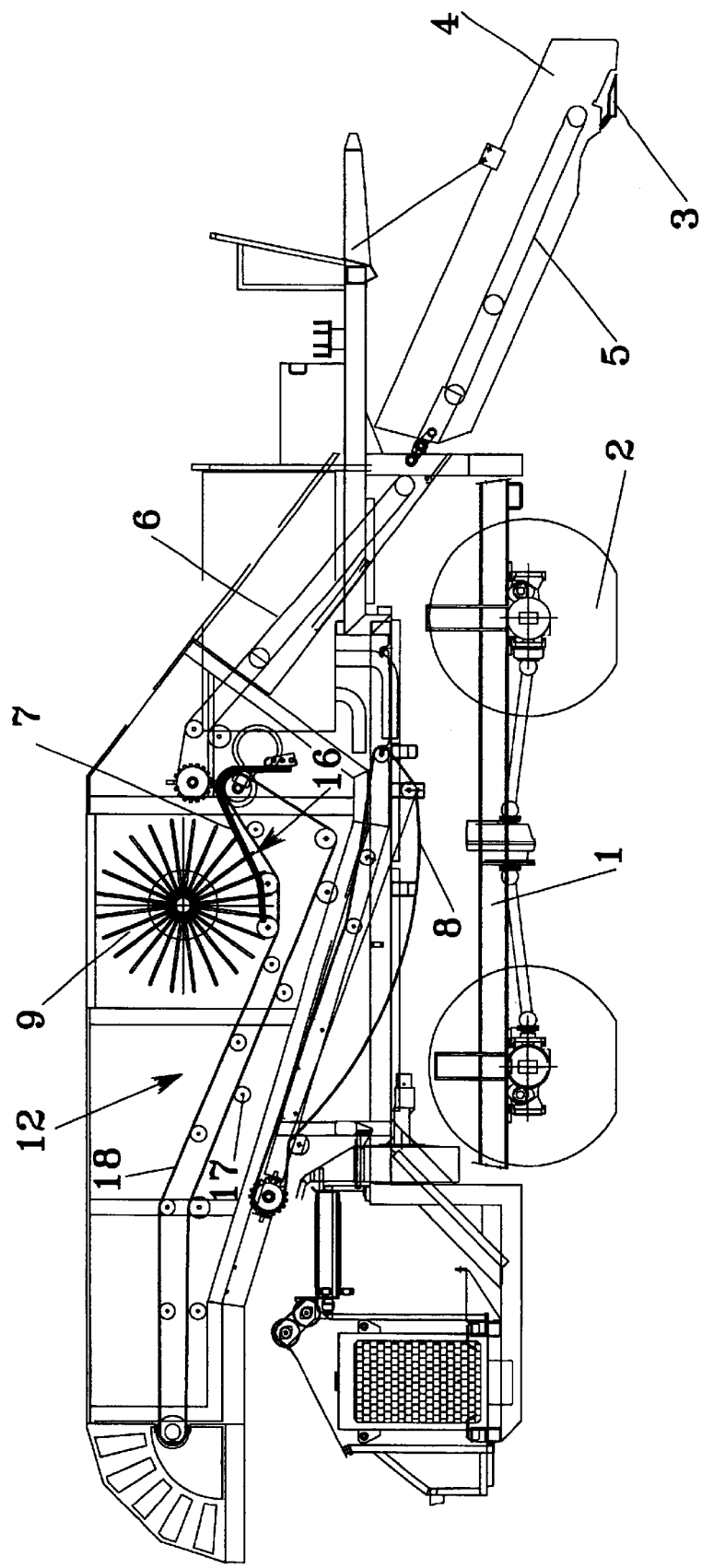
Figure 4:
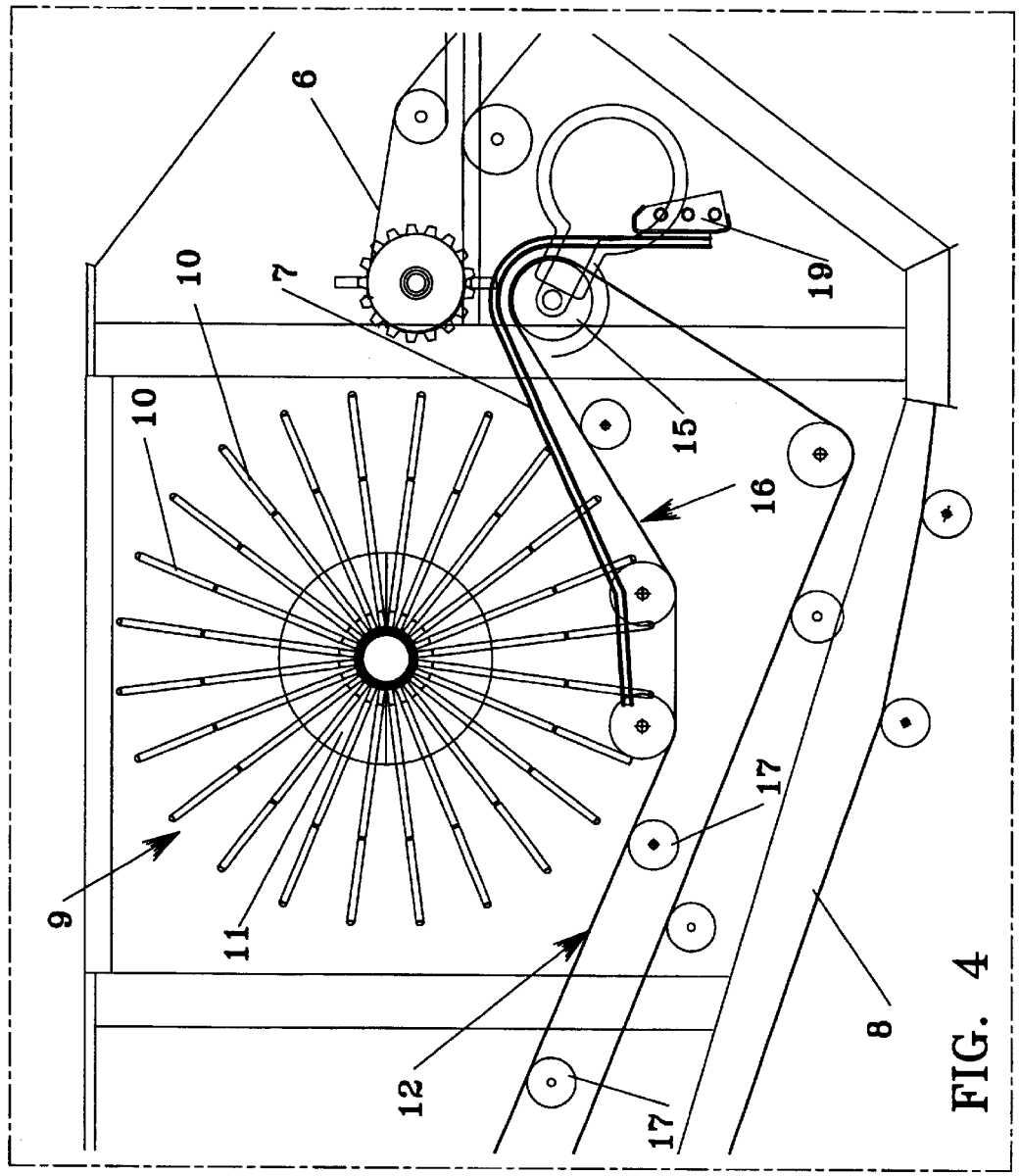

FIG. 3 schematically illustrates the side view of a harvester in accordance with the invention; and FIG. 4 is an enlarged detail of the harvester shown in FIG. 3.

DETAILED DESCRIPTION OF THE PREFERRED EMBODIMENTS

Figure 1:
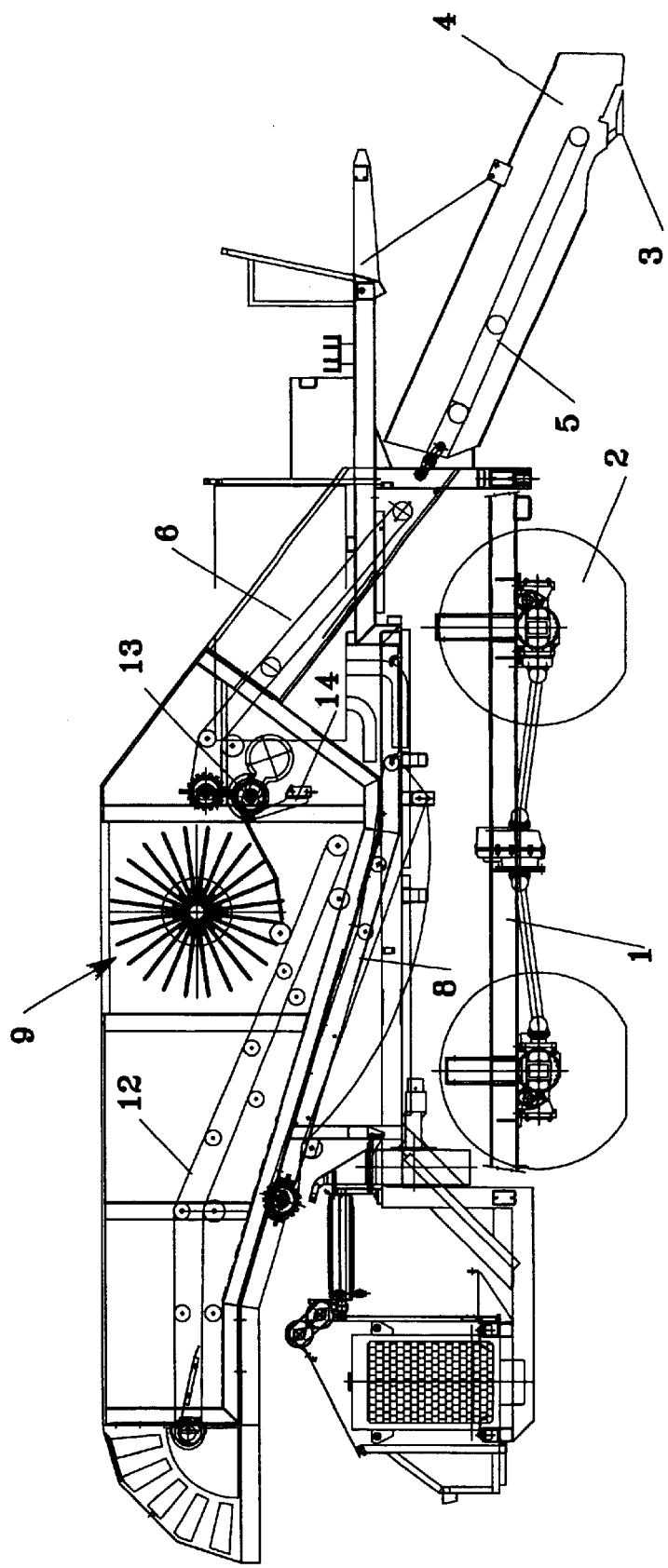
FIG. 1 is a side view of a known harvester.
Figure 2:
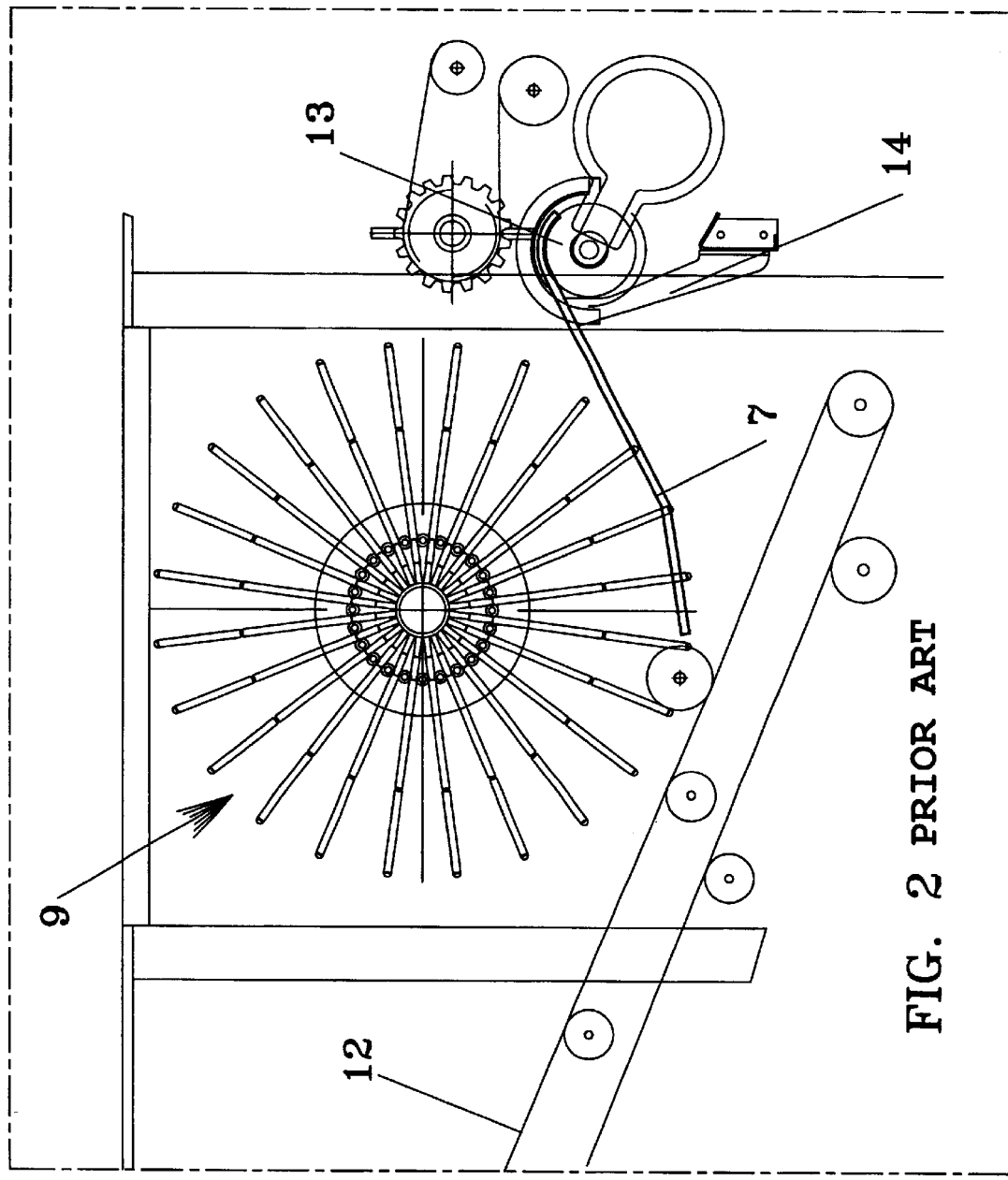
FIG. 2 is a detail of the harvester shown in FIG. 1.

The corresponding parts are indicated with the same numbers in FIGS. 1 and 2.

As before, the front of the harvester is fitted with a cutting blade 3 that cuts the plants, which fall onto a belt 5 from which they are conveyed to a feed belt 6.

Belt 6 unloads the plants into the harvester, where a shaker 9 detaches the tomatoes, which are collected by a belt 8.

Shaker 9 consists of a number of rods 10 fitted radially to support discs 11, which are made to rotate around their own axis so that the ends of rods 10 follow the route of advance of the plants.

Rods 10 are also subject to an undulating movement in a direction parallel to the axis of rotation of discs 11, with the result that they shake the plants to aid detachment of the tomatoes.

In accordance with the invention, a grid conveyor 12 installed under shaker 9 receives the plants from belt 6 and discharges them onto the ground outside the harvester after they exit from shaker 9.

In accordance with the invention, conveyor 12 leads to a point beneath feed belt 6, where the conveyor passes over an idler 15.

Grid conveyor 12 consists of a set of parallel rods driven by a pair of chains or the like; the said rods are spaced sufficiently far apart to allow the tomatoes to fall through the grid, which retains the plants.

A number of rollers 17 guide conveyor 12 along the various sections of the route.

In particular, in the harvester in accordance with the invention, the route of conveyor 12 comprises a first downwardly-sloping section 16, which leads from idler 15 to a point beneath shaker 9, followed by a second section 18 which leads outside the harvester.

In correspondence with section 16 of the route, a number of parallel bars 7 are fitted above the grid conveyor, and spaced at a sufficient distance apart to allow the tomatoes to fall between them.

Bars 7 are attached to a fixed support 19 upstream of conveyor 12. From support 19, bars 7 bend round idler 15; they then follow the route of conveyor 12 and terminate under shaker 9.

This configuration allows the elimination of rubber roller 13 and front supports 14 of bars 7, which were liable to clog in known harvesters and often caused the moving parts to jam.

With the new configuration, the branches and leaves of the plants still project below bars 7, but are engaged by the rods of conveyor 12 which pulls them forward, away from the unloading area, so that there is no risk of their being dragged backwards by feed belt 6 during the return section of its route.

Both practical and financial advantages are thereby obtained. The parts which were most liable to dirt accumulation and clogging in known harvesters have been eliminated, and the manufacturing costs are reduced because there is no need to include a rubber roller with a grooved surface to house the bars, or systems designed to rotate the said roller at the correct speed.

Further advantages include simplicity of manufacture and ease of maintenance.

Various forms of embodiment could be devised, all of which should be deemed to fall within the scope of this invention.

I claim:

1. A tomato harvester comprising:
    a loading belt arranged and adapted to pick up cut plants and introduce plants into the harvester at an unload area;
    a shaker to shake the plants to detach tomatoes;
    a collection belt to collect the tomatoes; and
    a conveyor arranged and adapted to receive the plants from said loading belt in said unload area, to engage the plants and pull them from the unload area, to convey the plants to said shaker and discharge the plants outside the harvester after the plants have been shaken by said shaker, said conveyor extending upstream of said shaker to a point directly beneath said loading belt and downstream from said shaker to a plant discharge area.

2. The tomato harvester in accordance with claim 1, further comprising a set of parallel bars that extend over said conveyor between said conveyor and said loading belt, said bars being below said loading belt and facing said shakers.

3. The tomato harvester in accordance with claim 2, wherein a section of said conveyor slopes downwardly from said loading belt to said shaker.

4. The tomato harvester in accordance with claim 3, wherein said bars are immediately above said conveyor.

5. The tomato harvester in accordance with claim 4, further comprising a support, integral with the chassis of the harvester, said support being upstream of said conveyor, said bars being attached to said support.

6. A tomato harvester comprising:
    a loading belt arranged and adapted to introduce cut plants into the harvester at an unload area;
    shakers arranged and adapted to shake out plants received from said loading belt in said unload area to detach tomatoes;
    a conveyor arranged and adapted to pull the plants from said unload area towards said shakers and then away from said shakers towards a plant discharge area; and
    a plurality of parallel bars below said loading belt and facing said shakers that extend over said conveyor between said conveyor and said loading belt;
    said conveyor comprising at least one section which slopes downwardly from said loading belt to said shakers.

7. The tomato harvester in accordance with claim 6, wherein said conveyor is a grid conveyor belt.

8. The tomato harvester in accordance with claim 7, wherein said conveyor is directly below said bar.

9. A tomato harvester comprising:
    a loading belt arranged and adapted to pick up cut plants and introduce cut plants into the harvester at an unload area;
    a shaker to shake the plants to detach tomatoes;
    a collection belt to collect the tomatoes;
    a conveyor arranged and adapted to receive cut plants from said loading belt in said unload area, said conveyor comprising:
        an idler to guide said conveyor beneath said loading belt;
        a first section sloping downwardly from said idler to a first point beneath said shaker; and
        a second section extending from a second point beneath said shaker to a plant discharge area,
    said harvester further comprising a set of fixed parallel bars that bend around said idler and extend between said idler and a roller of said loading belt.

* * * * *